US008310499B2

(12) United States Patent
Ivashin

(10) Patent No.: US 8,310,499 B2
(45) Date of Patent: Nov. 13, 2012

(54) BALANCING LUMINANCE DISPARITY IN A DISPLAY BY MULTIPLE PROJECTORS

(75) Inventor: Victor Ivashin, Danville, CA (US)

(73) Assignee: Seiko Epson Corporation, Tokyo (JP)

( * ) Notice: Subject to any disclaimer, the term of this patent is extended or adjusted under 35 U.S.C. 154(b) by 463 days.

(21) Appl. No.: 12/557,197

(22) Filed: Sep. 10, 2009

(65) Prior Publication Data

US 2011/0057943 A1    Mar. 10, 2011

(51) Int. Cl.
G09G 5/02 (2006.01)
H04N 9/31 (2006.01)

(52) U.S. Cl. ........ 345/589; 345/501; 345/582; 345/590; 345/591; 345/592; 345/593; 345/601; 345/602; 348/744; 348/E9.025; 382/164; 382/167; 382/169; 382/171; 382/172

(58) Field of Classification Search .................. 345/501, 345/582, 589, 590, 591, 592, 593, 601, 602; 348/744; 382/164, 167, 169, 171, 172
See application file for complete search history.

(56) References Cited

U.S. PATENT DOCUMENTS

| 6,456,339 | B1 | 9/2002 | Surati et al. |
| 6,480,175 | B1 * | 11/2002 | Schneider ........................ 345/32 |
| 6,727,864 | B1 | 4/2004 | Johnson et al. |
| 6,907,144 | B1 * | 6/2005 | Gindele ........................ 382/275 |
| 7,038,727 | B2 | 5/2006 | Majumder et al. |
| 7,129,456 | B2 | 10/2006 | Ioka et al. |
| 7,133,083 | B2 * | 11/2006 | Jaynes et al. .................. 348/745 |
| 2002/0012004 | A1 | 1/2002 | Deering |
| 2002/0041708 | A1 | 4/2002 | Pettitt |
| 2006/0007406 | A1 | 1/2006 | Adkins et al. |
| 2006/0022997 | A1 * | 2/2006 | Spampinato et al. ......... 345/606 |
| 2006/0280360 | A1 | 12/2006 | Holub |
| 2007/0091277 | A1 | 4/2007 | Damera-Venkata et al. |
| 2007/0171380 | A1 | 7/2007 | Wright et al. |
| 2007/0291184 | A1 | 12/2007 | Harville et al. |
| 2008/0143978 | A1 | 6/2008 | Damera-Venkata et al. |
| 2008/0259223 | A1 | 10/2008 | Read et al. |
| 2009/0027523 | A1 | 1/2009 | Chang et al. |
| 2010/0194851 | A1 * | 8/2010 | Pasupaleti et al. .............. 348/36 |

FOREIGN PATENT DOCUMENTS

JP    2006-108988    4/2006

* cited by examiner

Primary Examiner — Xiao M. Wu
Assistant Examiner — Todd Buttram

(57) ABSTRACT

In an example embodiment, a system for creating a display from multiple projectors receives as an input a source pixel derived from an image to be displayed. The system generates a scalar-adjusted pixel by applying a scalar for an adjustment range to each channel value in the source pixel, where the scalar depends on whether the source pixel is gray or color. The system modifies each channel value in the scalar-adjusted pixel according to a luminance adjustment curve for a projector, where the luminance adjustment curve depends on whether the source pixel is gray or color. The system generates the luminance adjustment curve from captured calibration images by: (1) creating an interpolated response curve; and (2) generating and inverting a median difference curve based on the interpolated response curve for the projector and the interpolated response curves for the other projectors in the system.

7 Claims, 19 Drawing Sheets

```
curveR=0.000000, 0.003922, 0.007843, 0.011765, 0.015686, 0.019608, 0.023529, 0.027451, 0.031373, 0.035294, 0.039216, 0.043137,
0.047059, 0.050980, 0.054902, 0.058824, 0.062745, 0.066667, 0.070588, 0.074510, 0.078431, 0.082353, 0.086275, 0.094118,
0.098039, 0.101961, 0.105882, 0.109804, 0.113725, 0.117647, 0.121569, 0.125490, 0.129412, 0.133333, 0.137255, 0.141176,
0.145098, 0.149020, 0.156863, 0.160784, 0.164706, 0.168627, 0.172549, 0.176471, 0.180392, 0.184314, 0.188235, 0.192157,
0.200000, 0.203922, 0.207843, 0.211765, 0.215686, 0.219608, 0.223529, 0.227451, 0.231373, 0.239216, 0.243137, 0.247059,
0.250980, 0.254902, 0.258824, 0.262745, 0.270588, 0.274510, 0.278431, 0.282353, 0.286275, 0.290196, 0.294118, 0.301961,
0.305882, 0.309804, 0.313725, 0.317647, 0.321569, 0.325490, 0.333333, 0.337255, 0.341176, 0.345098, 0.349020, 0.352941,
0.356863, 0.364706, 0.368627, 0.372549, 0.376471, 0.380392, 0.384314, 0.388235, 0.396078, 0.400000, 0.403922, 0.407843,
0.411765, 0.415686, 0.419608, 0.423529, 0.431373, 0.435294, 0.439216, 0.443137, 0.447059, 0.450980, 0.454902, 0.458824,
0.466667, 0.470588, 0.474510, 0.478431, 0.482353, 0.486275, 0.490196, 0.494118, 0.498039, 0.505882, 0.509804, 0.513725,
0.517647, 0.521569, 0.525490, 0.529412, 0.533333, 0.537255, 0.545098, 0.549020, 0.552941, 0.556863, 0.560784, 0.564706,
0.568627, 0.572549, 0.576471, 0.584314, 0.588235, 0.592157, 0.596078, 0.600000, 0.603922, 0.607843, 0.611765, 0.615686,
0.619608, 0.623529, 0.631373, 0.635294, 0.639216, 0.643137, 0.647059, 0.650980, 0.654902, 0.658824, 0.662745, 0.666667,
0.670588, 0.674510, 0.678431, 0.682353, 0.686275, 0.690196, 0.698039, 0.701961, 0.705882, 0.709804, 0.713725,
0.717647, 0.721569, 0.725490, 0.729412, 0.733333, 0.737255, 0.741176, 0.745098, 0.749020, 0.752941, 0.756863, 0.760784,
0.764706, 0.768627, 0.772549, 0.776471, 0.780392, 0.784314, 0.788235, 0.792157, 0.796078, 0.800000, 0.803922,
0.807843, 0.811765, 0.815686, 0.819608, 0.823529, 0.827451, 0.831373, 0.835294, 0.839216, 0.843137, 0.847059,
0.850980, 0.854902, 0.858824, 0.862745, 0.866667, 0.870588, 0.874510, 0.878431, 0.882353, 0.886275, 0.890196,
0.894118, 0.898039, 0.901961, 0.905882, 0.909804, 0.913725, 0.917647, 0.921569, 0.925490, 0.929412, 0.933333, 0.937255,
0.941176, 0.945098, 0.949020, 0.952941, 0.956863, 0.960784, 0.964706, 0.968627, 0.972549, 0.976471, 0.980392, 0.988235,
0.992157, 0.996078, 1.000000, 1.000000, 1.000000, 1.000000, 1.000000, 1.000000, 1.000000, 1.000000, 1.000000, 1.000000,
1.000000, 1.000000
```

Figure 5A-1

```
curveG=0.000000, 0.003922, 0.007843, 0.011765, 0.015686, 0.019608, 0.023529, 0.027451, 0.031373, 0.035294, 0.039216, 0.043137,
0.047059, 0.050980, 0.054902, 0.058824, 0.062745, 0.066667, 0.070588, 0.074510, 0.078431, 0.082353, 0.086275, 0.090196,
0.094118, 0.101961, 0.105882, 0.109804, 0.113725, 0.117647, 0.121569, 0.125490, 0.129412, 0.133333, 0.137255, 0.141176,
0.145098, 0.152941, 0.156863, 0.160784, 0.164706, 0.168627, 0.172549, 0.176471, 0.180392, 0.184314, 0.192157, 0.196078,
0.200000, 0.203922, 0.207843, 0.211765, 0.215686, 0.219608, 0.223529, 0.227451, 0.235294, 0.239216, 0.243137, 0.247059,
0.250980, 0.254902, 0.258824, 0.262745, 0.266667, 0.270588, 0.278431, 0.282353, 0.286275, 0.290196, 0.294118, 0.298039,
0.301961, 0.305882, 0.309804, 0.313725, 0.317647, 0.325490, 0.329412, 0.333333, 0.337255, 0.341176, 0.345098, 0.349020,
0.352941, 0.356863, 0.364706, 0.368627, 0.372549, 0.376471, 0.380392, 0.384314, 0.388235, 0.396078, 0.400000, 0.403922,
0.407843, 0.411765, 0.419608, 0.423529, 0.427451, 0.431373, 0.435294, 0.439216, 0.447059, 0.450980, 0.454902, 0.458824,
0.462745, 0.466667, 0.474510, 0.478431, 0.482353, 0.486275, 0.490196, 0.498039, 0.505882, 0.509804, 0.513725,
0.517647, 0.521569, 0.525490, 0.529412, 0.533333, 0.537255, 0.541176, 0.545098, 0.549020, 0.552941, 0.556863, 0.560784,
0.564706, 0.568627, 0.576471, 0.580392, 0.584314, 0.588235, 0.592157, 0.596078, 0.600000, 0.603922, 0.607843, 0.611765,
0.615686, 0.619608, 0.623529, 0.627451, 0.631373, 0.635294, 0.639216, 0.643137, 0.647059, 0.650980, 0.654902, 0.662745,
0.666667, 0.670588, 0.674510, 0.678431, 0.682353, 0.686275, 0.690196, 0.694118, 0.698039, 0.701961, 0.705882, 0.709804,
0.717647, 0.721569, 0.725490, 0.729412, 0.733333, 0.737255, 0.741176, 0.745098, 0.749020, 0.752941, 0.756863, 0.760784,
0.764706, 0.768627, 0.772549, 0.776471, 0.780392, 0.784314, 0.788235, 0.792157, 0.796078, 0.800000, 0.803922, 0.807843,
0.811765, 0.815686, 0.819608, 0.823529, 0.827451, 0.831373, 0.835294, 0.839216, 0.843137, 0.847059, 0.850980,
0.854902, 0.858824, 0.862745, 0.866667, 0.870588, 0.874510, 0.878431, 0.882353, 0.886275, 0.890196, 0.894118, 0.898039,
0.901961, 0.905882, 0.909804, 0.913725, 0.917647, 0.921569, 0.925490, 0.929412, 0.933333, 0.937255, 0.941176,
0.945098, 0.949020, 0.952941, 0.956863, 0.960784, 0.964706, 0.968627, 0.972549, 0.976471, 0.980392, 0.984314,
0.988235, 0.992157, 0.996078, 1.000000, 1.000000, 1.000000, 1.000000, 1.000000, 1.000000, 1.000000, 1.000000,
1.000000, 1.000000, 1.000000, 1.000000
```

Figure 5A-2

```
curveB=0.000000, 0.003922, 0.007843, 0.011765, 0.015686, 0.019608, 0.023529, 0.027451, 0.031373, 0.035294, 0.039216, 0.043137,
0.047059, 0.054902, 0.058824, 0.062745, 0.066667, 0.070588, 0.074510, 0.078431, 0.082353, 0.086275, 0.090196, 0.094118,
0.098039, 0.101961, 0.109804, 0.113725, 0.117647, 0.121569, 0.125490, 0.129412, 0.133333, 0.137255, 0.141176, 0.149020,
0.152941, 0.156863, 0.160784, 0.164706, 0.168627, 0.172549, 0.176471, 0.184314, 0.188235, 0.192157, 0.196078, 0.200000,
0.203922, 0.211765, 0.215686, 0.219608, 0.223529, 0.227451, 0.231373, 0.235294, 0.243137, 0.247059, 0.250980, 0.254902,
0.258824, 0.266667, 0.270588, 0.274510, 0.278431, 0.282353, 0.286275, 0.294118, 0.298039, 0.301961, 0.305882, 0.309804,
0.313725, 0.321569, 0.325490, 0.329412, 0.333333, 0.337255, 0.341176, 0.349020, 0.352941, 0.356863, 0.360784, 0.364706,
0.368627, 0.372549, 0.380392, 0.384314, 0.388235, 0.392157, 0.396078, 0.400000, 0.403922, 0.407843, 0.411765, 0.419608,
0.423529, 0.427451, 0.431373, 0.435294, 0.439216, 0.443137, 0.447059, 0.450980, 0.454902, 0.458824, 0.462745, 0.466667,
0.474510, 0.478431, 0.482353, 0.486275, 0.490196, 0.494118, 0.498039, 0.501961, 0.505882, 0.509804, 0.513725, 0.517647,
0.521569, 0.525490, 0.529412, 0.537255, 0.541176, 0.545098, 0.549020, 0.552941, 0.556863, 0.560784, 0.564706, 0.568627,
0.572549, 0.576471, 0.580392, 0.584314, 0.588235, 0.596078, 0.600000, 0.603922, 0.607843, 0.611765, 0.615686, 0.619608,
0.623529, 0.627451, 0.631373, 0.635294, 0.639216, 0.643137, 0.647059, 0.654902, 0.658824, 0.662745, 0.666667,
0.674510, 0.678431, 0.682353, 0.686275, 0.690196, 0.694118, 0.698039, 0.701961, 0.705882, 0.709804, 0.713725, 0.717647,
0.721569, 0.725490, 0.729412, 0.733333, 0.737255, 0.741176, 0.745098, 0.749020, 0.752941, 0.756863, 0.760784, 0.764706,
0.768627, 0.772549, 0.776471, 0.780392, 0.784314, 0.788235, 0.792157, 0.796078, 0.800000, 0.803922, 0.807843, 0.811765,
0.815686, 0.819608, 0.823529, 0.827451, 0.831373, 0.835294, 0.839216, 0.843137, 0.847059, 0.850980, 0.854902, 0.858824,
0.862745, 0.866667, 0.870588, 0.874510, 0.878431, 0.882353, 0.886275, 0.890196, 0.894118, 0.898039, 0.901961,
0.905882, 0.909804, 0.913725, 0.917647, 0.921569, 0.925490, 0.929412, 0.933333, 0.937255, 0.941176, 0.945098, 0.949020,
0.952941, 0.956863, 0.960784, 0.964706, 0.968627, 0.972549, 0.976471, 0.980392, 0.984314, 0.988235, 0.992157, 0.996078,
1.000000, 1.000000, 1.000000, 1.000000, 1.000000, 1.000000, 1.000000, 1.000000, 1.000000, 1.000000, 1.000000, 1.000000,
1.000000, 1.000000,
```

Figure 5A-3

```
curveRK=0.000000, 0.003922, 0.007843, 0.011765, 0.015686, 0.019608, 0.023529, 0.027451, 0.031373, 0.035294, 0.039216, 0.043137,
0.047059, 0.050980, 0.054902, 0.058824, 0.062745, 0.066667, 0.070588, 0.074510, 0.078431, 0.082353, 0.086275, 0.090196,
0.094118, 0.101961, 0.105882, 0.109804, 0.113725, 0.117647, 0.121569, 0.125490, 0.129412, 0.133333, 0.137255, 0.141176,
0.145098, 0.152941, 0.156863, 0.160784, 0.164706, 0.168627, 0.172549, 0.176471, 0.180392, 0.184314, 0.188235, 0.196078,
0.200000, 0.203922, 0.207843, 0.211765, 0.215686, 0.219608, 0.223529, 0.227451, 0.235294, 0.239216, 0.243137, 0.247059,
0.250980, 0.254902, 0.258824, 0.262745, 0.266667, 0.274510, 0.278431, 0.282353, 0.286275, 0.290196, 0.294118, 0.298039,
0.301961, 0.305882, 0.309804, 0.317647, 0.321569, 0.325490, 0.329412, 0.333333, 0.337255, 0.341176, 0.345098, 0.349020,
0.352941, 0.360784, 0.364706, 0.368627, 0.372549, 0.376471, 0.380392, 0.384314, 0.388235, 0.392157, 0.400000, 0.403922,
0.407843, 0.411765, 0.415686, 0.419608, 0.423529, 0.427451, 0.431373, 0.439216, 0.443137, 0.447059, 0.450980, 0.454902,
0.458824, 0.462745, 0.466667, 0.470588, 0.474510, 0.482353, 0.486275, 0.490196, 0.494118, 0.498039, 0.501961, 0.505882,
0.509804, 0.513725, 0.517647, 0.521569, 0.525490, 0.533333, 0.537255, 0.541176, 0.545098, 0.549020, 0.552941, 0.556863,
0.560784, 0.564706, 0.568627, 0.572549, 0.576471, 0.580392, 0.584314, 0.588235, 0.592157, 0.596078, 0.600000, 0.603922,
0.607843, 0.611765, 0.615686, 0.619608, 0.623529, 0.631373, 0.635294, 0.639216, 0.643137, 0.647059, 0.650980,
0.654902, 0.658824, 0.662745, 0.666667, 0.670588, 0.674510, 0.678431, 0.682353, 0.686275, 0.690196, 0.694118, 0.698039,
0.701961, 0.705882, 0.709804, 0.713725, 0.717647, 0.721569, 0.725490, 0.729412, 0.733333, 0.737255, 0.741176, 0.745098,
0.749020, 0.752941, 0.756863, 0.760784, 0.764706, 0.768627, 0.772549, 0.776471, 0.780392, 0.784314, 0.788235, 0.792157,
0.796078, 0.800000, 0.803922, 0.807843, 0.811765, 0.815686, 0.819608, 0.823529, 0.827451, 0.831373, 0.835294, 0.839216,
0.843137, 0.847059, 0.850980, 0.854902, 0.858824, 0.862745, 0.866667, 0.870588, 0.874510, 0.878431, 0.882353, 0.886275,
0.890196, 0.894118, 0.898039, 0.901961, 0.905882, 0.909804, 0.913725, 0.917647, 0.921569, 0.925490, 0.929412, 0.933333,
0.937255, 0.941176, 0.945098, 0.949020, 0.952941, 0.956863, 0.960784, 0.964706, 0.968627, 0.972549, 0.976471,
0.980392, 0.984314, 0.988235, 0.992157, 0.996078, 1.000000, 1.000000, 1.000000, 1.000000, 1.000000, 1.000000,
1.000000, 1.000000, 1.000000
```

Figure 5B-1

```
curveGK=0.000000, 0.003922, 0.007843, 0.011765, 0.015686, 0.019608, 0.023529, 0.027451, 0.031373, 0.035294, 0.039216, 0.043137,
0.047059, 0.050980, 0.054902, 0.058824, 0.062745, 0.066667, 0.070588, 0.074510, 0.082353, 0.086275, 0.090196, 0.094118,
0.098039, 0.101961, 0.105882, 0.109804, 0.113725, 0.117647, 0.121569, 0.129412, 0.133333, 0.137255, 0.141176, 0.145098,
0.149020, 0.152941, 0.156863, 0.164706, 0.168627, 0.172549, 0.176471, 0.180392, 0.184314, 0.188235, 0.196078, 0.200000,
0.203922, 0.207843, 0.211765, 0.215686, 0.219608, 0.227451, 0.231373, 0.235294, 0.239216, 0.243137, 0.247059, 0.254902,
0.258824, 0.262745, 0.266667, 0.270588, 0.274510, 0.278431, 0.286275, 0.290196, 0.294118, 0.298039, 0.301961, 0.305882,
0.313725, 0.317647, 0.321569, 0.325490, 0.329412, 0.333333, 0.337255, 0.341176, 0.349020, 0.352941, 0.356863, 0.360784,
0.364706, 0.368627, 0.372549, 0.380392, 0.384314, 0.388235, 0.392157, 0.396078, 0.400000, 0.403922, 0.407843, 0.415686,
0.419608, 0.423529, 0.427451, 0.431373, 0.435294, 0.439216, 0.443137, 0.447059, 0.454902, 0.458824, 0.462745, 0.466667,
0.470588, 0.474510, 0.478431, 0.482353, 0.486275, 0.490196, 0.494118, 0.498039, 0.505882, 0.509804, 0.513725, 0.517647,
0.521569, 0.525490, 0.529412, 0.533333, 0.537255, 0.541176, 0.545098, 0.549020, 0.552941, 0.556863, 0.560784, 0.564706,
0.568627, 0.572549, 0.576471, 0.580392, 0.584314, 0.588235, 0.592157, 0.596078, 0.600000, 0.603922, 0.607843, 0.611765,
0.615686, 0.619608, 0.623529, 0.631373, 0.635294, 0.639216, 0.643137, 0.647059, 0.650980, 0.654902, 0.658824,
0.662745, 0.666667, 0.670588, 0.674510, 0.678431, 0.682353, 0.686275, 0.690196, 0.694118, 0.698039, 0.701961, 0.705882,
0.709804, 0.713725, 0.717647, 0.721569, 0.725490, 0.729412, 0.733333, 0.737255, 0.741176, 0.745098, 0.749020, 0.752941,
0.756863, 0.760784, 0.764706, 0.768627, 0.772549, 0.776471, 0.780392, 0.784314, 0.788235, 0.792157, 0.796078, 0.800000,
0.803922, 0.807843, 0.811765, 0.815686, 0.819608, 0.823529, 0.827451, 0.831373, 0.835294, 0.839216, 0.843137,
0.847059, 0.850980, 0.854902, 0.858824, 0.862745, 0.866667, 0.870588, 0.874510, 0.878431, 0.882353, 0.886275, 0.890196,
0.894118, 0.898039, 0.901961, 0.905882, 0.909804, 0.913725, 0.917647, 0.921569, 0.925490, 0.929412, 0.933333,
0.937255, 0.941176, 0.945098, 0.949020, 0.952941, 0.956863, 0.960784, 0.964706, 0.968627, 0.972549, 0.976471,
0.980392, 0.984314, 0.988235, 0.992157, 0.996078, 1.000000, 1.000000, 1.000000, 1.000000, 1.000000, 1.000000, 1.000000,
1.000000, 1.000000, 1.000000
```

Figure 5B-2

```
curveBK=0.000000, 0.003922, 0.007843, 0.011765, 0.015686, 0.019608, 0.023529, 0.027451, 0.031373, 0.035294, 0.039216, 0.043137,
0.050980, 0.054902, 0.058824, 0.062745, 0.066667, 0.070588, 0.074510, 0.078431, 0.082353, 0.090196, 0.094118, 0.098039,
0.101961, 0.105882, 0.109804, 0.117647, 0.121569, 0.125490, 0.129412, 0.133333, 0.141176, 0.145098, 0.149020, 0.152941,
0.156863, 0.164706, 0.168627, 0.172549, 0.176471, 0.184314, 0.188235, 0.192157, 0.196078, 0.200000, 0.207843, 0.211765,
0.215686, 0.219608, 0.223529, 0.231373, 0.235294, 0.239216, 0.243137, 0.247059, 0.254902, 0.258824, 0.262745, 0.266667,
0.270588, 0.274510, 0.282353, 0.286275, 0.290196, 0.294118, 0.298039, 0.301961, 0.305882, 0.313725, 0.317647, 0.321569,
0.325490, 0.329412, 0.333333, 0.337255, 0.345098, 0.349020, 0.352941, 0.356863, 0.360784, 0.364706, 0.368627, 0.372549,
0.380392, 0.384314, 0.388235, 0.392157, 0.396078, 0.400000, 0.403922, 0.407843, 0.415686, 0.419608, 0.423529, 0.427451,
0.431373, 0.435294, 0.439216, 0.443137, 0.447059, 0.450980, 0.458824, 0.462745, 0.466667, 0.470588, 0.474510, 0.478431,
0.482353, 0.486275, 0.490196, 0.494118, 0.498039, 0.501961, 0.505882, 0.509804, 0.513725, 0.517647, 0.521569, 0.525490,
0.529412, 0.533333, 0.537255, 0.541176, 0.545098, 0.549020, 0.552941, 0.556863, 0.560784, 0.564706, 0.568627,
0.572549, 0.576471, 0.580392, 0.584314, 0.588235, 0.592157, 0.596078, 0.600000, 0.603922, 0.607843, 0.611765, 0.615686,
0.619608, 0.623529, 0.627451, 0.631373, 0.635294, 0.639216, 0.643137, 0.647059, 0.650980, 0.654902, 0.658824,
0.662745, 0.666667, 0.670588, 0.674510, 0.678431, 0.682353, 0.686275, 0.690196, 0.694118, 0.698039, 0.701961, 0.705882,
0.709804, 0.713725, 0.717647, 0.721569, 0.725490, 0.733333, 0.737255, 0.741176, 0.745098, 0.749020, 0.752941, 0.752941,
0.756863, 0.760784, 0.764706, 0.768627, 0.772549, 0.776471, 0.780392, 0.784314, 0.788235, 0.792157, 0.796078, 0.800000,
0.803922, 0.807843, 0.811765, 0.815686, 0.819608, 0.823529, 0.827451, 0.831373, 0.835294, 0.839216, 0.843137, 0.847059,
0.850980, 0.854902, 0.858824, 0.862745, 0.866667, 0.870588, 0.874510, 0.878431, 0.882353, 0.886275, 0.890196,
0.894118, 0.898039, 0.901961, 0.905882, 0.909804, 0.913725, 0.917647, 0.921569, 0.925490, 0.929412, 0.933333,
0.937255, 0.941176, 0.945098, 0.949020, 0.952941, 0.952941, 0.956863, 0.960784, 0.964706, 0.968627, 0.972549, 0.976471,
0.980392, 0.984314, 0.988235, 0.992157, 0.996078, 1.000000,
1.000000, 1.000000, 1.000000, 1.000000, 1.000000, 1.000000, 1.000000, 1.000000, 1.000000, 1.000000, 1.000000
```

BALANCING LUMINANCE DISPARITY IN A DISPLAY BY MULTIPLE PROJECTORS

BACKGROUND

A digital image based on the RGB (Red Green Blue) color model has pixels composed of three primary color components: red, green, and blue. The additive combination of the three component color intensities determines the final pixel color. It is useful to think of the digital image as having three separate color channels, each channel describing pixel intensities for only one color component: red, green, or blue. RGB channels roughly follow the color receptors in the human eye and are used in computer displays and image scanners.

If an RGB image is 24-bit, each of the three channels is allotted 8 bits to represent the channel's color component intensity value for each pixel. One might think of such an RGB image as being composed of three grayscale images, each the same dimensional size as the RGB image and representing a channel associated with a color component, where each grayscale image can store discrete pixels with luminance values between 0 and 255 (e.g. 8-bits). Also one might describe a pixel in the RGB image as an ordered tuple whose first element represents a pixel value in the grayscale image for red, whose second element represents a pixel value in the grayscale image for green, and whose third element represents a pixel value in the grayscale image for blue. An example of such a tuple is (32, 64, 128), where the luminance for blue is twice the luminance for green and the luminance for green is twice the luminance for red. An example of a maximum pixel value expressed using such a tuple is (255, 255, 255), typically associated with the color white. An RGB image pixel is described as gray if each element in the tuple has the same value (e.g. all color components have equal influence). Otherwise, the RGB image pixel is described as having color.

When trying to create a display from a system of multiple projectors, a desirable attribute is seamlessness. That is to say, the display from one projector in the system should not be easily discernable by the human eye when combined with the displays from the other projectors in the system. Disparities with respect to the luminance resulting from individual projectors in the system detract from such seamlessness, though such disparities are perhaps inevitable due to factors like device settings, lamp age, panel and filter alignment, and even the reflectivity of the display surface.

SUMMARY

In an example embodiment, a system for creating a display from multiple projectors receives as an input a source pixel derived from an image to be displayed. The system applies a scalar for an adjustment range to each channel value in the source pixel to create a scalar-adjusted pixel, where the scalar depends on whether the source pixel is gray or color. The system modifies each channel value in the scalar-adjusted pixel according to a luminance adjustment curve for a projector, where the luminance adjustment curve to be applied depends on whether the source pixel is gray or color. The system then outputs the modified scalar-adjusted pixel, following further processing, to the projector.

In another example embodiment, the system generates the luminance adjustment curve for a projector in the system by capturing a number of calibration images displayed by the projector, where the projected calibration images differ with respect to a value for a channel in a pixel. The system determines a sampling region for each captured calibration image and computes a median value for the channel in the sampling region. The system then creates an interpolated response curve for the projector that relates the differing channel values in the projected calibration images to the median values in the captured calibration images. The system generates a median difference curve for the projector based on the interpolated response curve and the interpolated response curves for the other projectors in the system. Then the system inverts the median difference curve to obtain a luminance adjustment curve for the projector that is stored and used by the system to adjust the display from the projector.

These and other aspects and advantages of the claimed inventions will become apparent from the following detailed description, which taken in conjunction with the accompanying drawings, illustrates by way of example the principles of the inventions.

BRIEF DESCRIPTION OF THE DRAWINGS

FIG. 5A is an example set of luminance (or color) adjustment curves, depicted in tabular form, for a color source pixel, in accordance with an example embodiment.

FIG. 5B is an example set of luminance (or color) adjustment curves, depicted in tabular form, for a gray source pixel, in accordance with an example embodiment.

DETAILED DESCRIPTION

In the following description, numerous specific details are set forth in order to provide a thorough understanding of the exemplary embodiments. However, it will be apparent to one skilled in the art that the example embodiments might be practiced without some of these specific details. In other instances, process operations and implementation details have not been described in detail, if already well known.

Figure 1:
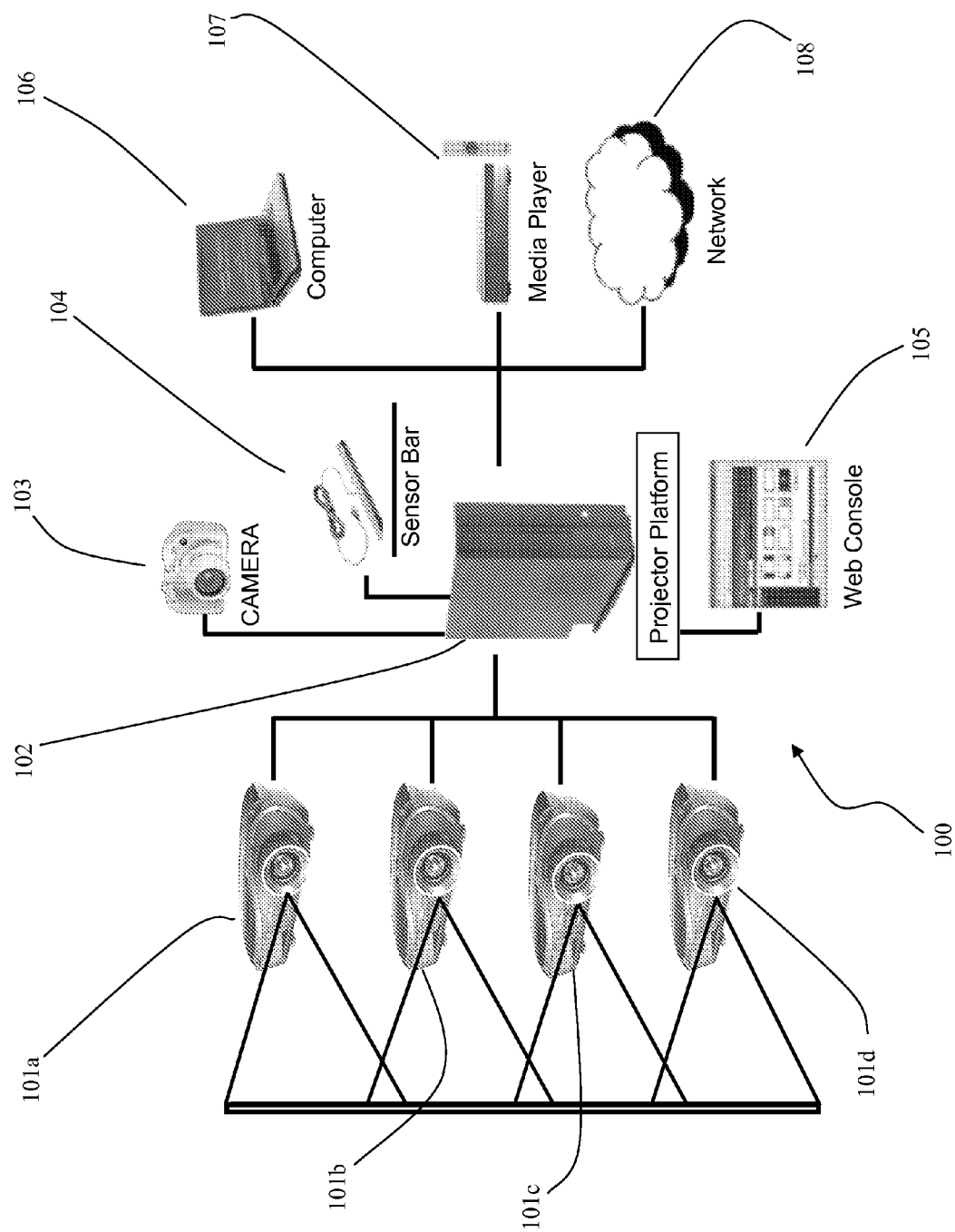
FIG. 1 is a schematic diagram of the hardware components for a system for creating a relatively seamless display from multiple projectors, in accordance with an example embodiment.

FIG. 1 is a schematic diagram of the hardware components for a system for creating a relatively seamless display from multiple projectors, in accordance with an example embodiment. In this embodiment, the system 100 includes a projector platform 102, which might be a general-purpose computer configured with a central processing unit (CPU) and a number of graphic processing units (GPUs), as well as memory, storage, and an operating system, such as a version of Linux® or Windows®. For example, the CPU might be an Intel® Quad-Core Q6600 microprocessor and the GPUs might be two graphics cards which conform to the Peripheral Component Interconnect Express (PCIe) standard, such as the NVIDIA® GeForce 9800 GTX graphics cards. The two graphics cards allow the projector platform 102 to send video output for projection onto a surface to four video projectors, 101a, 101b, 101c, and 101d.

It will be appreciated that the example embodiments described herein might accommodate projection onto a flat surface or a surface that is irregular in terms of evenness. In an example embodiment, a digital still camera 103 (or a digital camera that is capable of taking a still photograph) is attached to projector platform 102 using USB (universal serial bus) cabling during calibration of the system 100. In alternative example embodiment, a digital video camera might be used for calibration of the system 100. Following calibration, the digital camera 103 might be removed. An optional capture card allows for video input to the projector platform 102 from a laptop 106, from a media player 107, and/or from a network 108, which might be a LAN (local area network), a WAN (wide area network), the Internet, etc. An optional sensor bar 104 allows for non-video input to the projector platform 102, as does the web console 105, which might receive input from a keyboard and/or a mouse.

Figure 2:
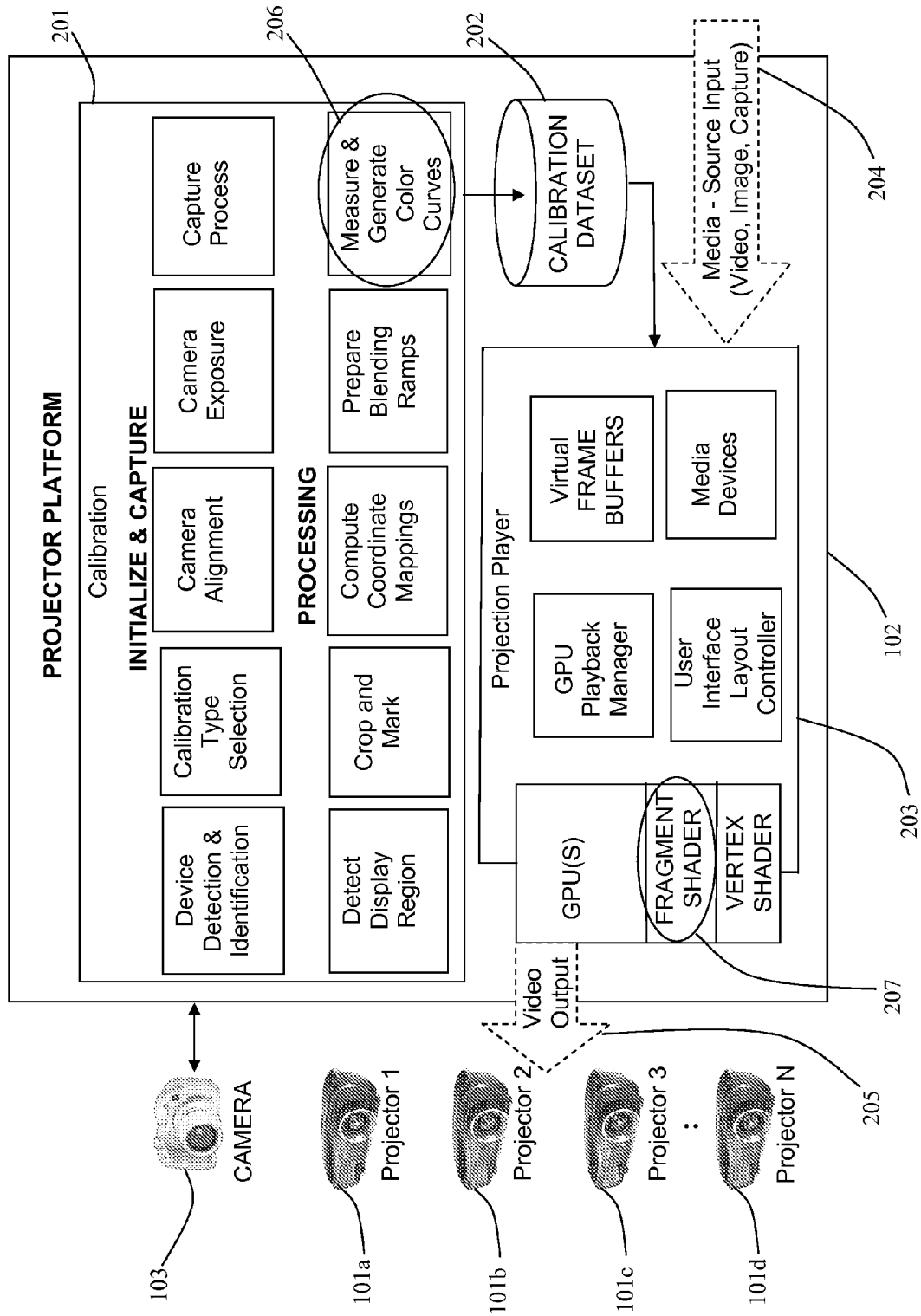
FIG. 2 is a schematic diagram of the high-level functional modules in a system for creating a relatively seamless display from multiple projectors, in accordance with an example embodiment.

FIG. 2 is a schematic diagram of the high-level functional modules in a system for creating a relatively seamless display from multiple projectors, in accordance with an example embodiment. In this embodiment, the projector platform 102 receives inputs 204 which are processed and then output as video 205 to video projectors 101a, 101b, 101c, and 101d. As depicted in this figure, the inputs 204 might be video, images, or captures (e.g., captured with frame-grabber hardware or over a network). The digital camera 103 also provides input in the form of captured calibration images to the projector platform 102.

As depicted in FIG. 2, the projector platform 102 executes two high-level modules, which might be software, firmware, and/or hardware in example embodiments: a calibration module 201 and a projection player 203. The calibration module 201 interfaces with the projection player 203 through the calibration dataset 202, which persistently stores the output of the calibration module 201 for subsequent use by the projection player 203. The calibration module 201 includes two groups of modules. The first group of modules generally pertains to initialization and capture and includes modules for: (1) device detection and identification; (2) calibration type selection; (3) camera alignment; (4) camera exposure; and (5) capture process. Some of these modules are described in greater detail in the concurrently filed application by the same inventor entitled, "Setting Exposure Attributes for Capturing Calibration Images", Attorney Docket No. AP410HO, which is hereby incorporated by reference. The second group of modules generally pertains to processing and includes modules to: (1) detect display regions; (2) crop and mask; (3) compute coordinate mappings; (4) prepare blending ramps; and (5) measure and generate luminance (or color) adjustment curves. All results output by calibration module 201, including the luminance (or color) adjustment curves, are stored in the calibration dataset 202.

The projection player 203 takes as inputs the data stored in the calibration dataset 202 and the media 204. As depicted in FIG. 2, the projection player 203 includes the following modules: (1) a GPU playback manager; (2) virtual frame buffers; (3) a user-interface layout controller; and (4) media drawers. The projection player 203 interfaces with the system's GPUs, which execute a fragment shader 207 and a vertex shader, in order to generate the adjusted video output 205 transmitted to the projectors 101a-101d for display on a surface. The fragment shader 207 is the module in which the luminance (or color) adjustment curves are applied to pixels in source images, in an example embodiment described below.

It will be appreciated that at this point in the system, the media drawers have derived the source image from input 204, generated content, and virtual frame buffers, according to geometric conversions determined by the projection environment. Further geometric operations might be performed by the vertex shader (e.g., mappings) or by initial processes in the fragment shader 207. Consequently, the source image already incorporates the geometry of the image to be projected when the source image reaches the later processes of the fragment shader 207, where the luminance adjustment curves are applied.

In alternative example embodiments, other modules (e.g., the GPU playback manager) in the projection player 203 might also be suitable for application of the luminance adjustment curves.

Figure 3A:
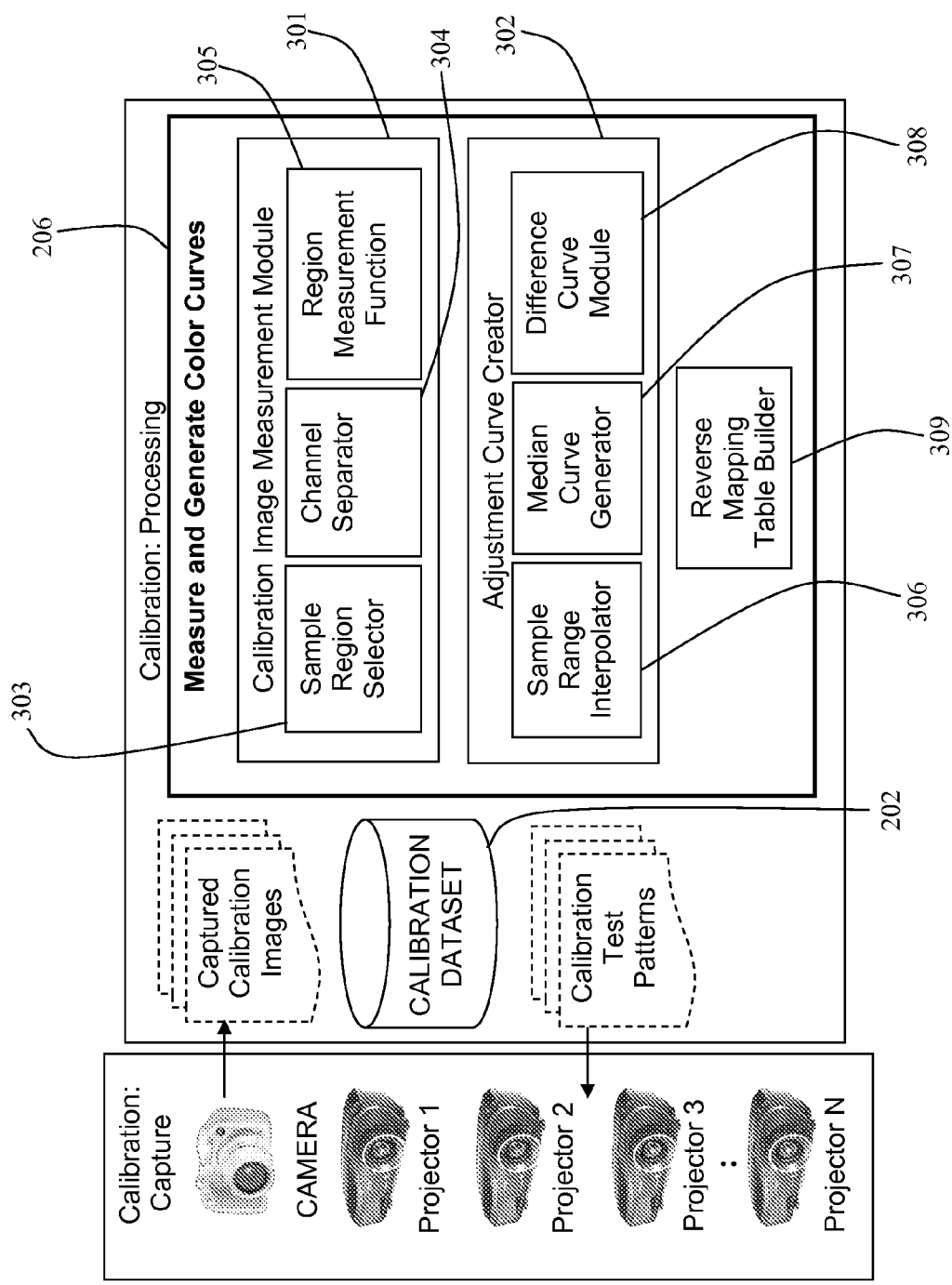
FIG. 3A is a schematic diagram of the functional components in a module for generating luminance (or color) adjustment curves from captured calibration images, in accordance with an example embodiment.

FIG. 3A is a schematic diagram of the functional components in a module for generating luminance (or color) adjustment curves from captured calibration images, in accordance with an example embodiment. It will be appreciated that this module is depicted as module 206 in FIG. 2. As shown in FIG. 3A, the module 206 includes a calibration image measurement module 301, an adjustment curve creator 302, and a reverse mapping table builder 309. In turn, the calibration image measurement module 301 includes: (1) a module 303 for selecting a sample region from a captured calibration image resulting from a calibration test pattern displayed by a projector in the system; (2) a module 304 for separating the channels in the sample region; and (3) a module 305 for measuring the channels in the sample region (e.g., calculating a median value). The adjustment curve creator 302 includes: (1) a module 306 for the generation of an interpolated response curve associated with a projector; (2) a module 307 for the generation of a median curve from two or more interpolated response curves; and (3) a module 308 for the generation of a median difference curve for each projector from the median curve. As explained in greater detail below, the reverse mapping table builder 309 generates a reverse mapping table by inverting the median difference curve for a projector. In an example embodiment, the reverse mapping tables are then persistently stored in the calibration dataset 202.

Figure 3B:
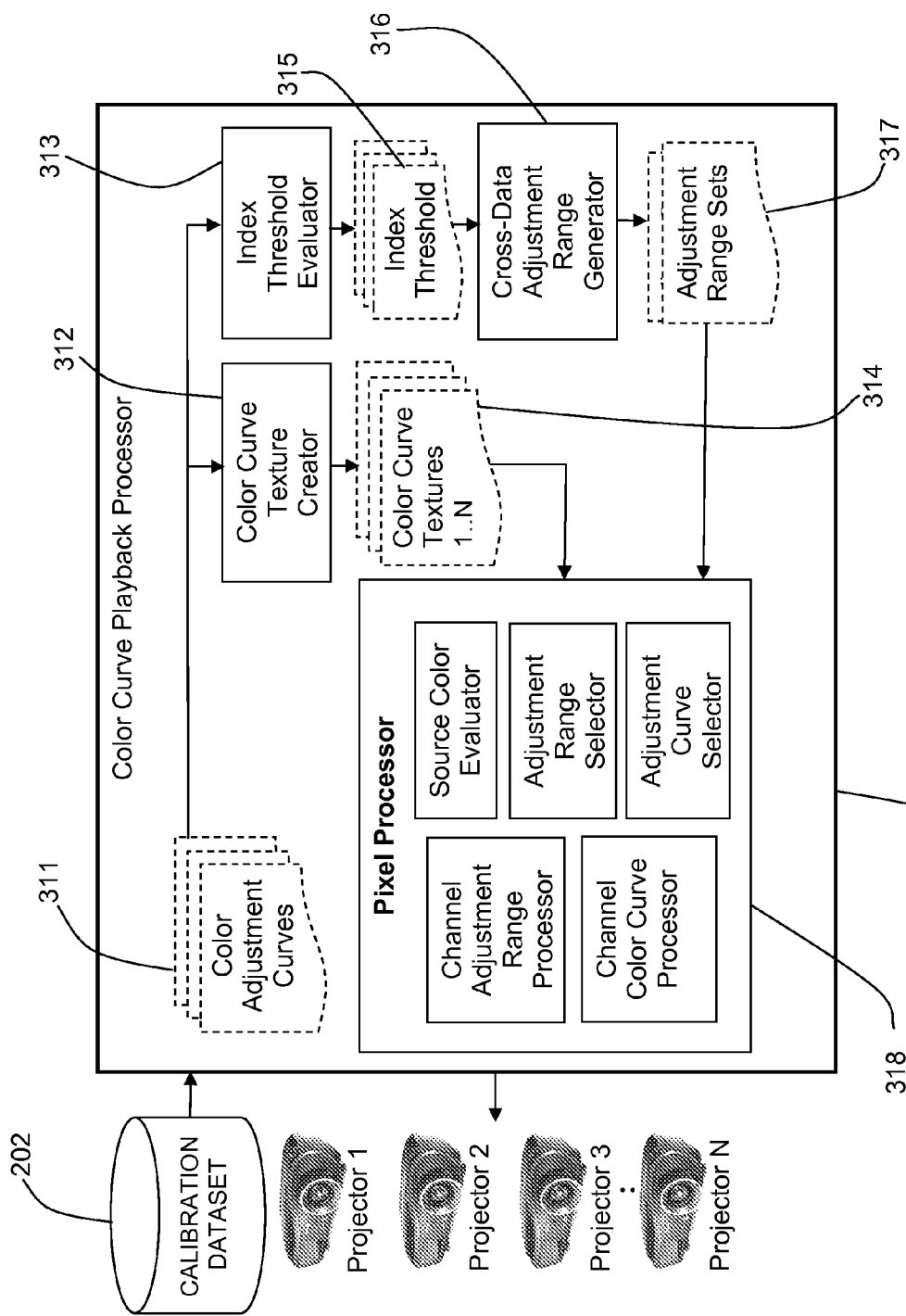
FIG. 3B is a schematic diagram of the functional components in a module for applying luminance (or color) adjustment curves during projection of a source image, in accordance with an example embodiment.

FIG. 3B is a schematic diagram of the functional components in a module for applying luminance (or color) adjustment curves during projection of a source image, in accordance with an example embodiment. It will be appreciated that this module 310 (e.g., Color Curve Playback Processor) might be included in projection player 203 in FIG. 2, in an example embodiment. In that example embodiment, the pixel processor 318 in FIG. 3B might include the fragment shader 207 in FIG. 2. As shown in FIG. 3B, module 310 includes: (1) a module 312 for creating a texture map 314 for a luminance (or color) adjustment curve 311 from the calibration dataset 202; (2) a module 313 for evaluating a luminance (or color) adjustment curve 311 and generating an index threshold 315; (3) a module 316 for generating a cross-data adjustment range set 317; and (4) a pixel processor 318. The function of these modules will be described in greater detail below. Also as shown in FIG. 3B, the pixel processor 318 includes: (1) a source color evaluator; (2) an adjustment range selector; (3) an adjustment curve selector; (4) a channel adjustment range processor; and (5) a channel color curve processor. As suggested in the description of FIG. 3A, the luminance (or color) adjustment curves 311 might be stored as reverse mapping tables in the calibration dataset 202, in an example embodiment discussed further below.

Figure 4:
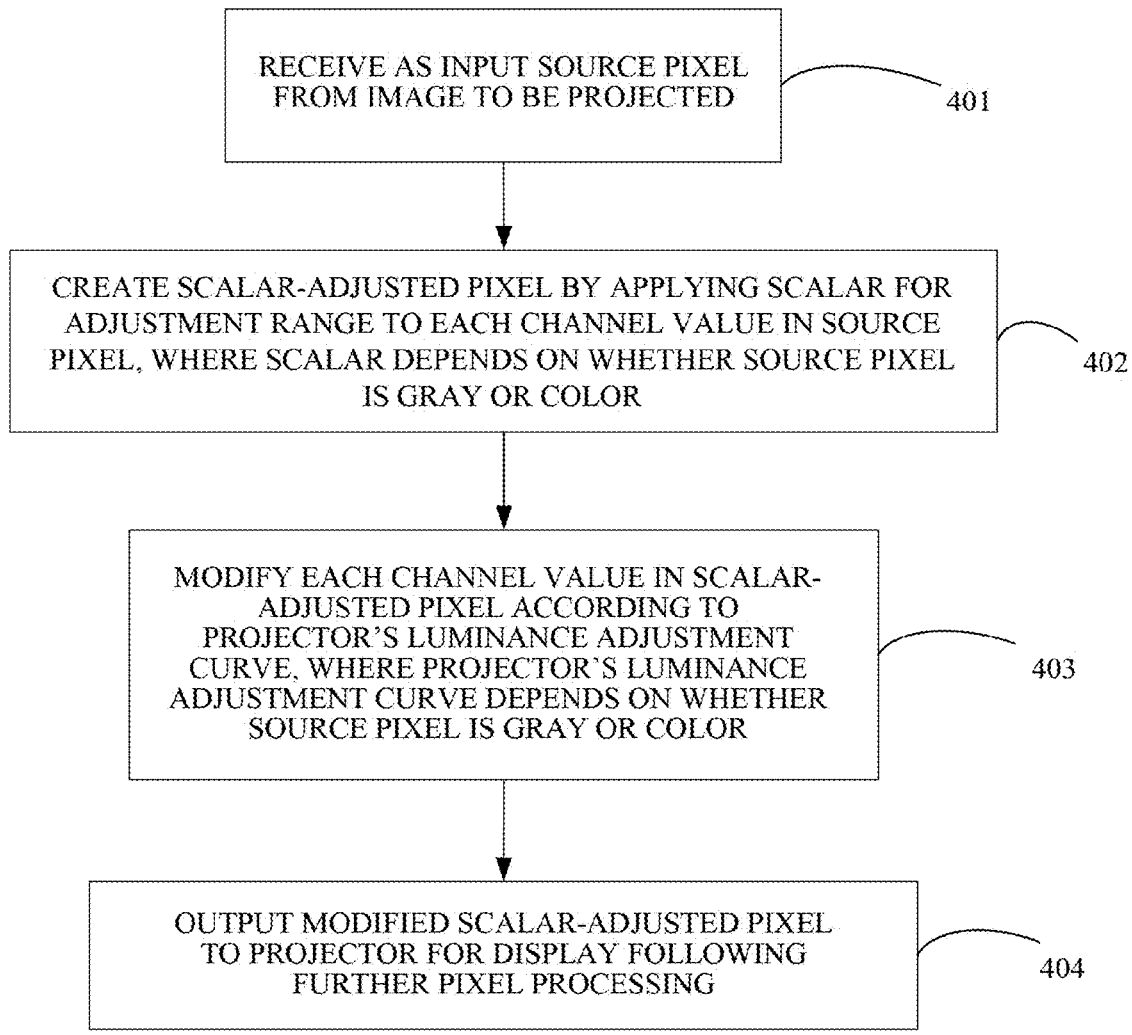
FIG. 4 is a flowchart diagram illustrating a process for balancing luminance disparity in a system for creating a relatively seamless display from multiple projectors, in accordance with an example embodiment.

FIG. 4 is a flowchart diagram illustrating a process for balancing luminance disparity in a system for creating a relatively seamless display from multiple projectors, in accordance with an example embodiment. This process might execute in the Color Curve Playback Processor 310 in FIG. 3B or in some other combination of modules in the projection player 203 in FIG. 2. In the first operation 401 of the process shown in FIG. 4, the playback processor receives as input a source pixel from an image to be projected by one of the projectors in the system. In the second operation 402 of the process, the playback processor creates a scalar-adjusted pixel by applying a scalar for an adjustment range to each channel (e.g., R, G, or B) value in the source pixel. In an example embodiment, the scalar to be applied to each channel value depends on whether the source pixel is gray or color, as discussed further below. Then in the third operation 403 of the process, the playback processor modifies each channel value in the scalar-adjusted pixel, according to the projector's luminance adjustment curve. Here again, the luminance adjustment curve to be applied to each channel value depends on whether the source pixel is gray or color. In the fourth operation 404 of the process, the playback processor outputs the modified scalar-adjusted pixel to the projector for display, after subsequent pixel processing.

As indicated above, the input to operation 401 is a source pixel. Generally speaking, the source pixel might be constructed from the source (e.g., scene content) input to the fragment shader, the known output pixel vertex location, and projection matrix calculations.

In operation 402, the playback processor applies a scalar which depends on whether the source pixel is gray or color. In an example embodiment, the playback processor might determine that a source pixel is gray if all of the source pixel's channel values are the same, e.g., (128, 128, 128). Likewise, in operation 403, the playback processor applies a luminance adjustment curve that also depends on whether the source pixel is gray or color. Here again, the playback processor might determine that a source pixel is gray if all of the pixel's channel values are the same, e.g., (128, 128, 128).

In an example embodiment, the playback processor uses each of the scalar-adjusted pixel's channel values to index into a luminance adjustment curve (or table) and obtain a replacement (or modified) value, as generally described in operation 403. To avoid indexing into a luminance adjustment curve (or table) past the curve's adjustable capability, the playback processor multiplies the channel value by a scalar, as described in operation 402. In effect, the range of the channel values are reduced to the range of the available replacement channel values, where the replacement channel values have an output maximum similar to the output maximum of the dimmest projector in the system.

In operation 404, the playback processor outputs the modified scalar-adjusted pixel to the projector for display following further pixel processing. In an example embodiment, the further pixel processing might include edge blending, black level correction, or other similar operations.

FIG. 5A is an example set of luminance (or color) adjustment curves, depicted in tabular form, for a color source pixel, in accordance with an example embodiment. FIG. 5B is an example set of luminance (or color) adjustment curves, depicted in tabular form, for a gray source pixel, in accordance with an example embodiment. Both FIGS. 5A and 5B are associated with a single projector in the system. It will be appreciated that a reason for distinguishing between gray and color source pixels is that luminance response curves tend to be different (e.g., optimized by projection devices) for gray values and color values.

FIG. 5A includes three tables identified as curveR, curveG, and curveB. Each of these tables is an array with 256 luminance values. FIG. 5B includes three tables identified as curveRK, curveGK, and curveBK. Each of these tables is also an array with 256 luminance values. Each table's name reflects its associated channel as designated by a letter in the RGB color model. The indexes to each array in FIGS. 5A and 5B represent an integer value in the range 0 to 255 as determined by the 8-bit color channel component range for a 24-bit RGB color space. In alternative example embodiments, other color models might be used to create luminance adjustment curves, e.g., the CMYK (Cyan Magenta Yellow Black) color model.

In an example embodiment, the values in each array are ordered according to progressively increasing index, from the value at index 0 through the value at index 255. This order allows the channel values of source pixels to be used directly as indexes to the arrays. Each array value is a replacement (or adjustment) luminance value for a channel value. In an example embodiment, these array values are normalized between 0.0 and 1.0. For example, if a channel value is represented by a byte, a normalized replacement luminance value at some index might be 0.564706 corresponding to a replacement channel value of 144 (e.g., 0.564706×255). Values of 1.0 represent the maximum assignable channel value (e.g., 255 when the channel is a byte or 8 bits). If a luminance adjustment curve contains a value 1.0 at some index i, all values greater than index i will also be 1.0, in accordance with the processes used to generate luminance adjustment curves described below.

In an example embodiment, the scaling performed (e.g., application of a scalar in operation 402) by the playback processor might make use of: (1) index thresholds; and (2) cross-data adjustment ranges. To find an index threshold, the playback processor scans the values in an array, starting at index 0, searching for an index where the value reaches a maximum (e.g. 1.0). Such an index is the index threshold and defines the point in the luminance adjustment curve at which any further adjustment changes will be ineffectual (e.g. the point where output will reach a maximum or output has reached a maximum relative to other projectors). By definition, an index threshold will have an integer value ranging 0 to 255. For example, a luminance adjustment curve for a relatively dim projector might reach the maximum adjustment value of 1.0 halfway through the array. In this example, the index threshold will be 127 (e.g., the 128th value in the array). Index thresholds less than 255 can be found in the arrays depicted in curveR, curveG, and curveB in FIG. 5A.

In an example embodiment, the operation of finding an index threshold might be performed during the loading of values into a luminance (or color) adjustment curve. In an alternative example embodiment, this operation might be performed after loading the luminance adjustment curve. Also the playback processor might combine finding index thresholds with computing cross-data adjustment ranges.

Cross-data adjustment ranges consist of two adjustment ranges: one associated with the sets of luminance adjustment curves for color source pixels (e.g., curveR, curveG, and curveB for all projectors) and one associated with the luminance adjustment curves for gray source pixels (e.g., curveRK, curveGK, and curveBK for all projectors). Each adjustment range provides three adjustment range values that each represent a scalar threshold adjustment for the respective R, G, or B channel value of a source pixel prior to channel value replacement using the associated adjustment curve.

After the luminance adjustment curves have been generated for all projectors and their index thresholds have been determined, the playback processor can compute a cross-data adjustment range. For this operation, the playback processor determines the minimum index threshold determined for each related luminance adjustment curve across all projectors. For example, the playback processor might examine the index thresholds for all "curveR" tables for all projectors. The smallest index threshold is then assigned to the first adjustment range as the computed adjustment range value for the R channel for color source pixels. It will be appreciated that such an examination might include collecting, sorting in ascending order, and choosing the bottommost index threshold. The playback processor would repeat a similar operation on the index thresholds for all "curveG" tables, all "curveB" tables, all "curveRK" tables, all "curveGK" tables, and all "curveBK" tables.

Each computed adjustment range value is between 0 and 255 and matches the units of each index value. The playback processor then replaces each computed adjustment range value with its value divided by 255 to form an adjustment range value between 0.0 and 1.0 representing a scalar threshold adjustment. The result is a set of adjustment ranges which are easily applied (e.g., by multiplying the scalar threshold adjustment values from an appropriately selected adjustment range with a source pixel's channel values) during the process depicted in FIG. 4. As indicated above, the playback processor scales source pixels according to the adjustment range values prior to luminance adjustment curve replacement such that the luminance adjustment curves' values that are indexed by scaled source pixel values are not beyond a maximum brightness capability of the dimmest projector in the set of projectors.

In an alternative embodiment, the system might make cross-data adjustments to luminance adjustment curves at the time the luminance adjustment curves are created or stored (e.g. stretch, clip, or otherwise rebalance and normalize luminance adjustment curve tables according to the dimmest projector by approximating the effect of cross-data adjustment ranges such that each source pixel channel value index has full table range and thus no need for scalar adjustment). However, in that alternative embodiment, it would be more difficult to perform dynamic rebalancing of luminance values in the event a calibrated projector (e.g., a projector having captured calibration images) is powered off or an alternate calibrated projector is powered on. That is to say, if the playback processor makes cross-data adjustments at run-time as depicted in the process in FIG. 4, dynamic rebalancing of luminance values might simply require re-computation and application of the values for the cross-data adjustment ranges.

As indicated earlier, the playback processor might use a texture map to pass the two sets (e.g., gray and color) of luminance adjustment curves to the fragment shader. In alternative example embodiments, the playback processor might pass the two sets of luminance adjustment curves to the fragment shader using any other suitable data structure.

Figure 6:
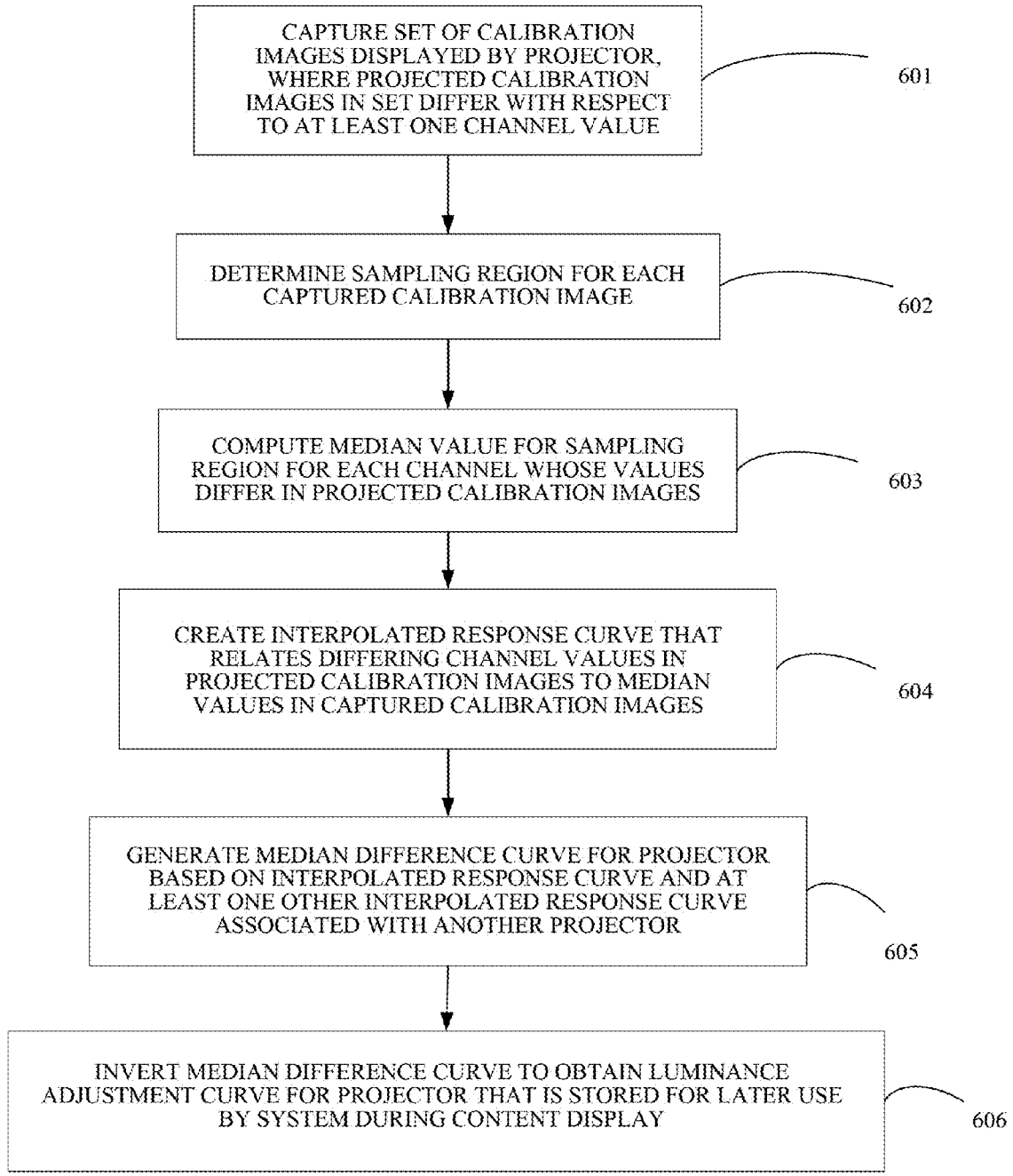
FIG. 6 is a flowchart diagram illustrating a process for generating luminance adjustment curves, in accordance with an example embodiment.

FIG. 6 is a flowchart diagram illustrating a process for generating luminance adjustment curves, in accordance with an example embodiment. In an example embodiment, this process might execute in a calibration-processing module 206 as depicted in FIGS. 2 and 3A. In the first operation 601 of the process, the calibration-processing module captures a set of calibration images displayed by a projector in the system. The projected calibration images in the set differ with respect to at least one channel value in a pixel in the calibration image, as described further below. In the second operation 602 of the process, the calibration-processing module determines a sampling region for each captured calibration image. In the third operation 603 of the process, the calibration-processing module computes a median value for the sampling region for each channel whose values differ in the projected calibration images. In an alternative example embodiment, another statistic measuring central tendency might be employed instead, e.g., an average instead of a median.

In the fourth operation 604 of the process, the calibration-processing module creates an interpolated response curve for the projector. The interpolated response curve relates the differing channel values in the projected calibration images to the computed median values in the captured calibration images. In the fifth operation 605 of the process, the calibration-processing module generates a median difference curve for the projector based on the interpolated response curve and at least one other interpolated response curve derived from other projectors in the system. Then in the sixth operation 606 of the process, the calibration-processing module inverts the median difference curve to obtain a luminance adjustment curve for the projector that is stored (e.g., in the calibration dataset 202) for later use by the system during content display.

Figure 7:
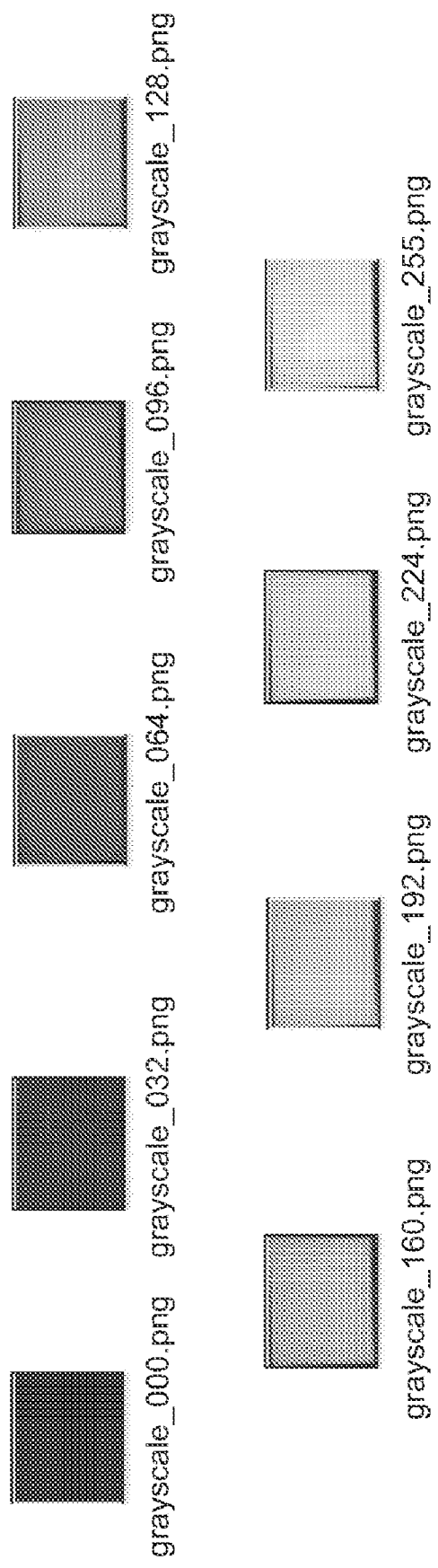
FIG. 7 shows a number of gray calibration images captured and processed by a system for creating a relatively seamless display from multiple projectors, in accordance with an example embodiment.

FIG. 7 shows a number of gray calibration images captured and processed by a system for creating a relatively seamless display from multiple projectors, in accordance with an example embodiment. It will be appreciated that these captured calibration images might result from operation 601 of the process shown in FIG. 6. All of the captured images in FIG. 7 were displayed by one projector in the system. As indicated in the figure, the captured calibration images are stored as PNG (Portable Network Graphics) files, though any other suitable image file format might be substituted, such as JPEG (Joint Photographic Experts Group) or BMP (bitmap). Also as indicated in the figure, each captured calibration image relates to a projected calibration image with known luminance values for each pixel channel. Thus, the captured calibration image identified as grayscale_064.png results from the projection and capture of a calibration image whose RGB channel values are (64, 64, 64). Similarly, the captured calibration image identified as grayscale_128.png results from the projection and capture of a calibration image whose RGB channel values are (128, 128, 128). Here it will be appreciated that the three channel values are always equal in a gray image. In an example embodiment, the processing performed on the captured calibration images might include masking and cropping. In another embodiment, a captured calibration image might be derived from masking and cropping a larger captured image to a bounded region within the larger captured image containing the one projector's display output of a projected calibration image.

Similar captured calibration images for color, as opposed to gray, images are not shown, but are included in the set of captured calibration images for each projector in the system. Thus, the set of captured calibration images might include an image identified as redscale_032.png which results from the projection and capture of a calibration image whose RGB channel values are (32, 0, 0). Likewise, the set of captured calibration images might include an image identified as greenscale_064.png which results from the projection and capture of a calibration image whose RGB channel values are (0, 64, 0). And the set of captured calibration images might include an image identified as bluescale_224.png which results from the projection and capture of a calibration image whose RGB channel values are (0, 0, 224).

Additionally, the set of captured calibration images for each projector might also include an image identified as ambient_000.png which results from capture of a camera view of the display surface without light output from the projector. The RGB channel values in ambient_000.png might then be measured and subtracted from the RGB values measured in the other captured calibration images, to remove any luminance resulting from ambient conditions, e.g., a brightly lit room.

Figure 8:
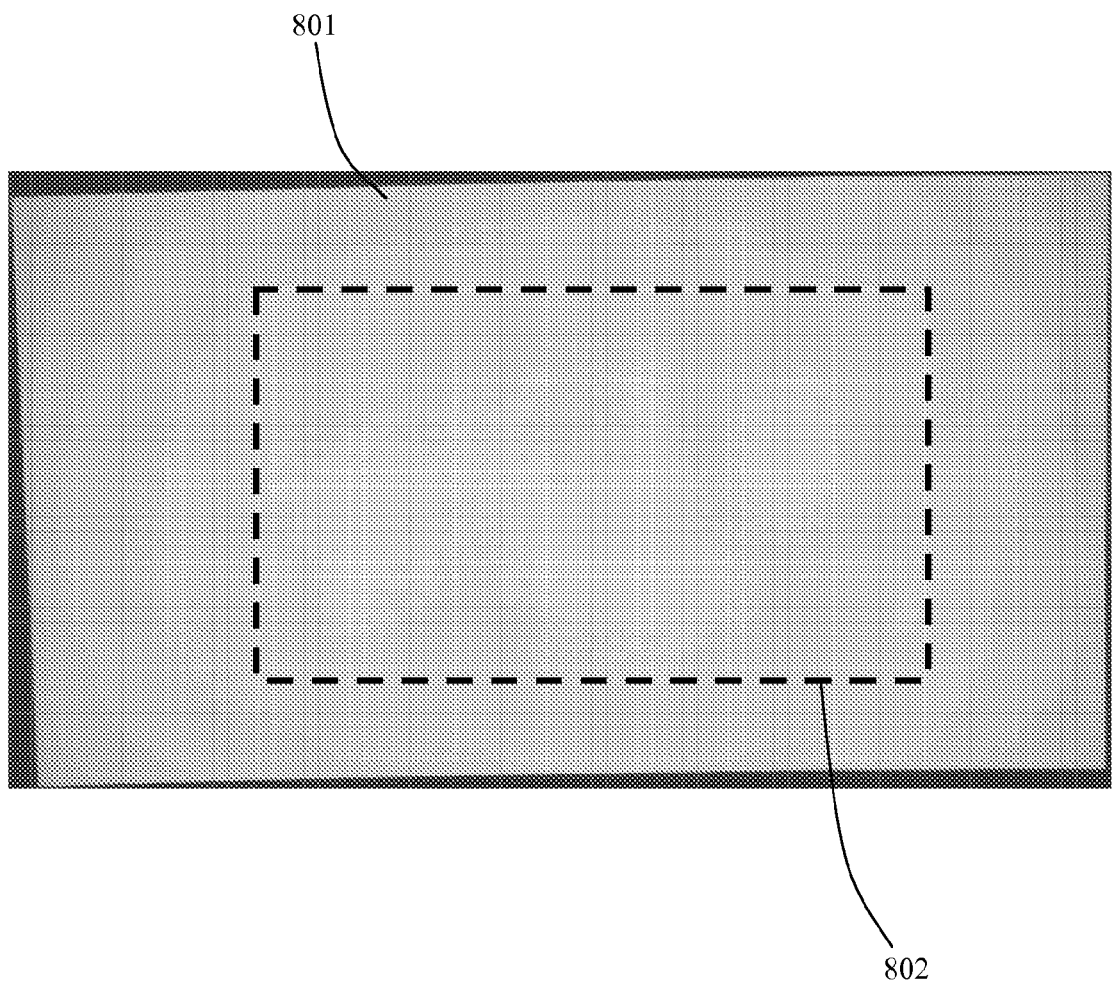
FIG. 8 shows a sampling region in a captured calibration image, in accordance with an example embodiment.

FIG. 8 shows a sampling region in a captured calibration image, in accordance with an example embodiment. It will be appreciated that the sampling region might result from operation 602 of the process shown in FIG. 6. As depicted in FIG. 8, a module (such as the calibration image measurement module 301 in FIG. 3A) computes a sampling region 802 centered on a captured calibration image 801, which has been masked and cropped to the displayable region of one projector. In an example embodiment, the size of the sampling region 802 might be calculated to be 60% of the dimensional width and height of the captured calibration image, though any other suitable area might be substituted in an alternative example embodiment.

Figure 9A:
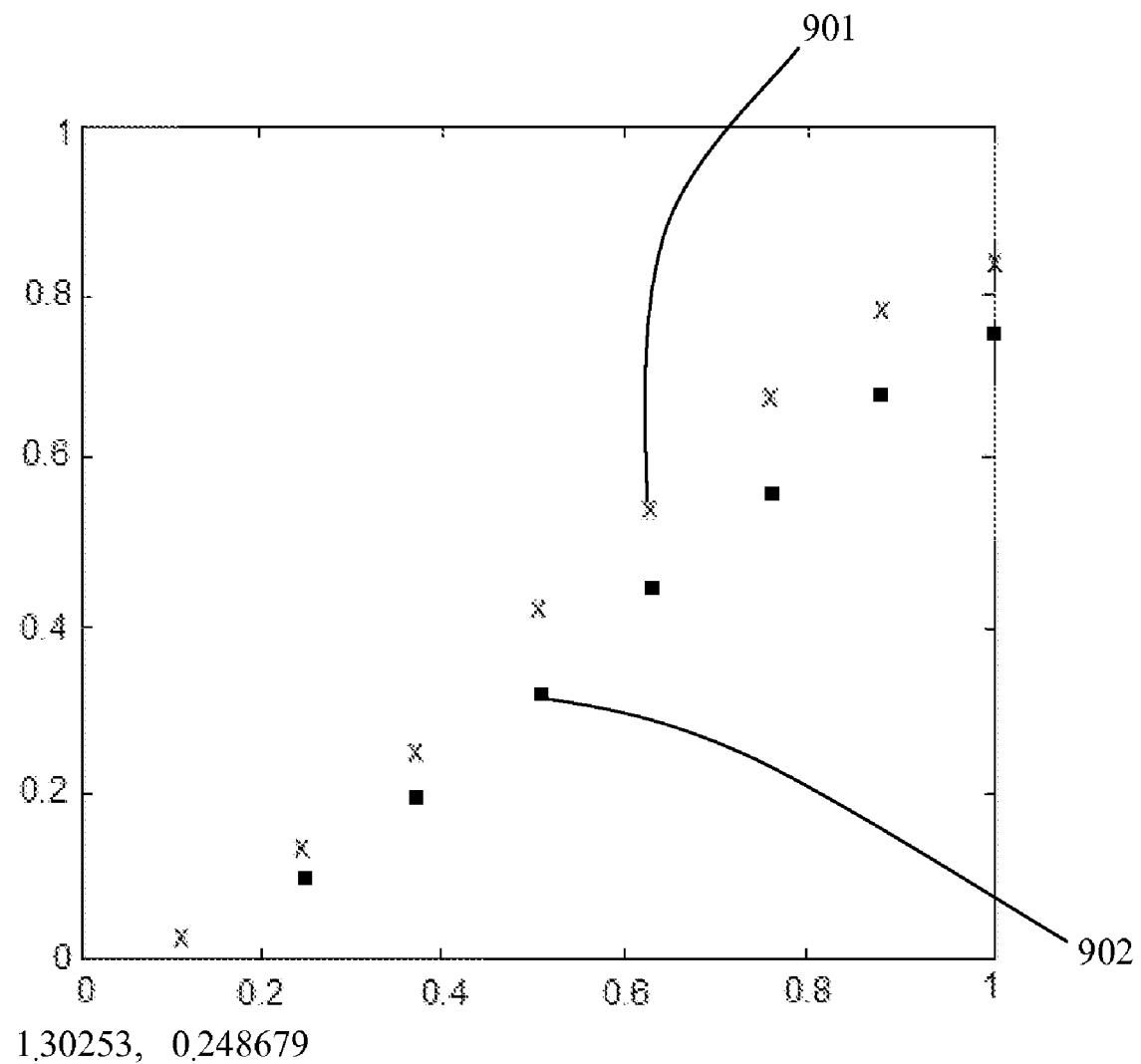
FIGS. 9A and 9B depict response curves before and after interpolation, respectively, in accordance with an example embodiment.
Figure 9B:
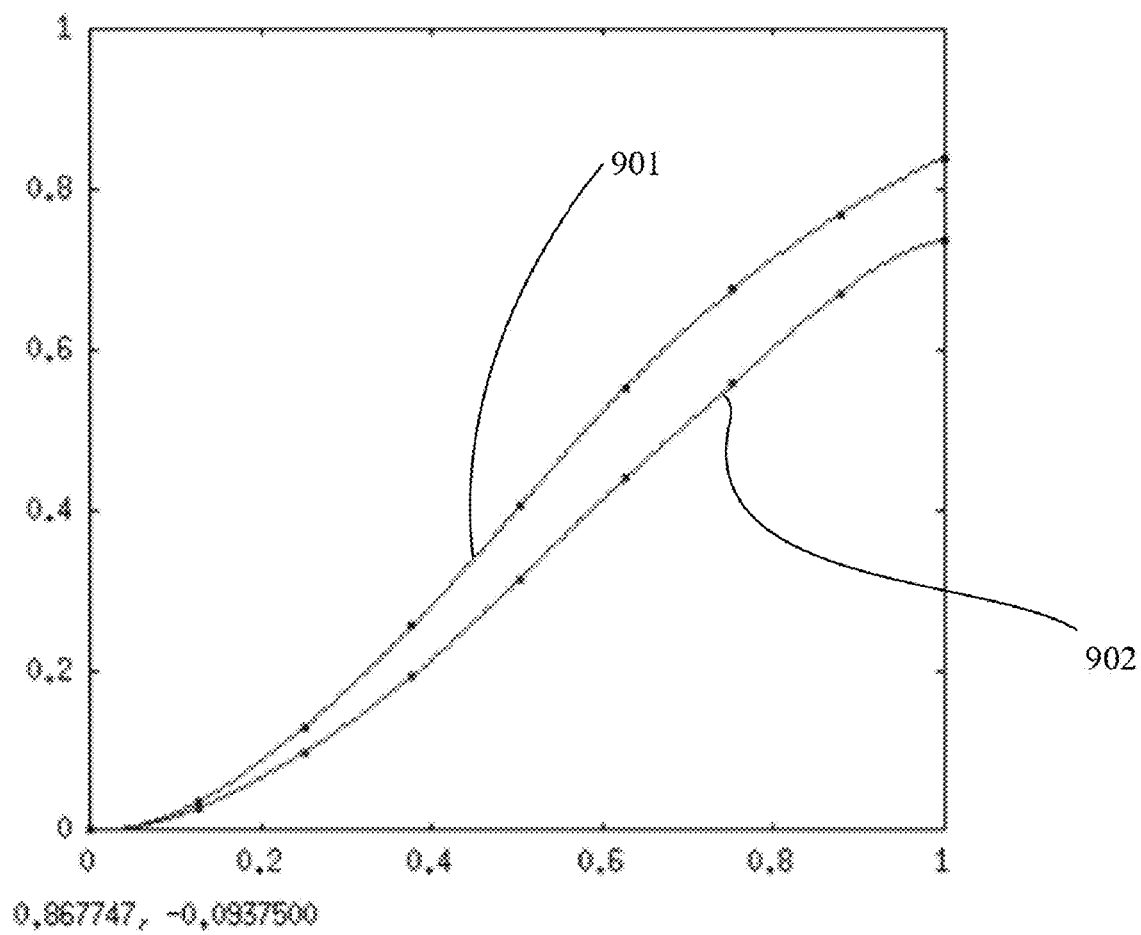

FIGS. 9A and 9B depict response curves before and after interpolation, respectively, in accordance with an example embodiment. It will be appreciated that the response curves might result from operation 604 and use data samples from operation 603 of the process shown in FIG. 6. FIG. 9A includes two response curves for projectors 901 and 902 respectively, for one channel, as does FIG. 9B. It will be appreciated that the axes of all the response curves have been normalized to show values between 0 and 1, rather than values between 0 and 255 (e.g., the values available when a channel is represented by a byte, or 8 bits). Each axis represents channel luminance in a range normalized between 0.0 and 1.0. The horizontal axis represents known values while the vertical axis represents response values. Curve points are plotted by relating the known channel values obtained from the set of calibration images against the response channel values. It will be appreciated that a response channel value might be a median value for a sampling region from a captured calibration image. In an example embodiment, the interpolated response curves in FIG. 9B might result from cubic spline interpolation of the curve points shown in FIG. 9A, though any suitable form of interpolation (e.g., linear spline interpolation) might be substituted in an alternative example embodiment.

Figure 10A:
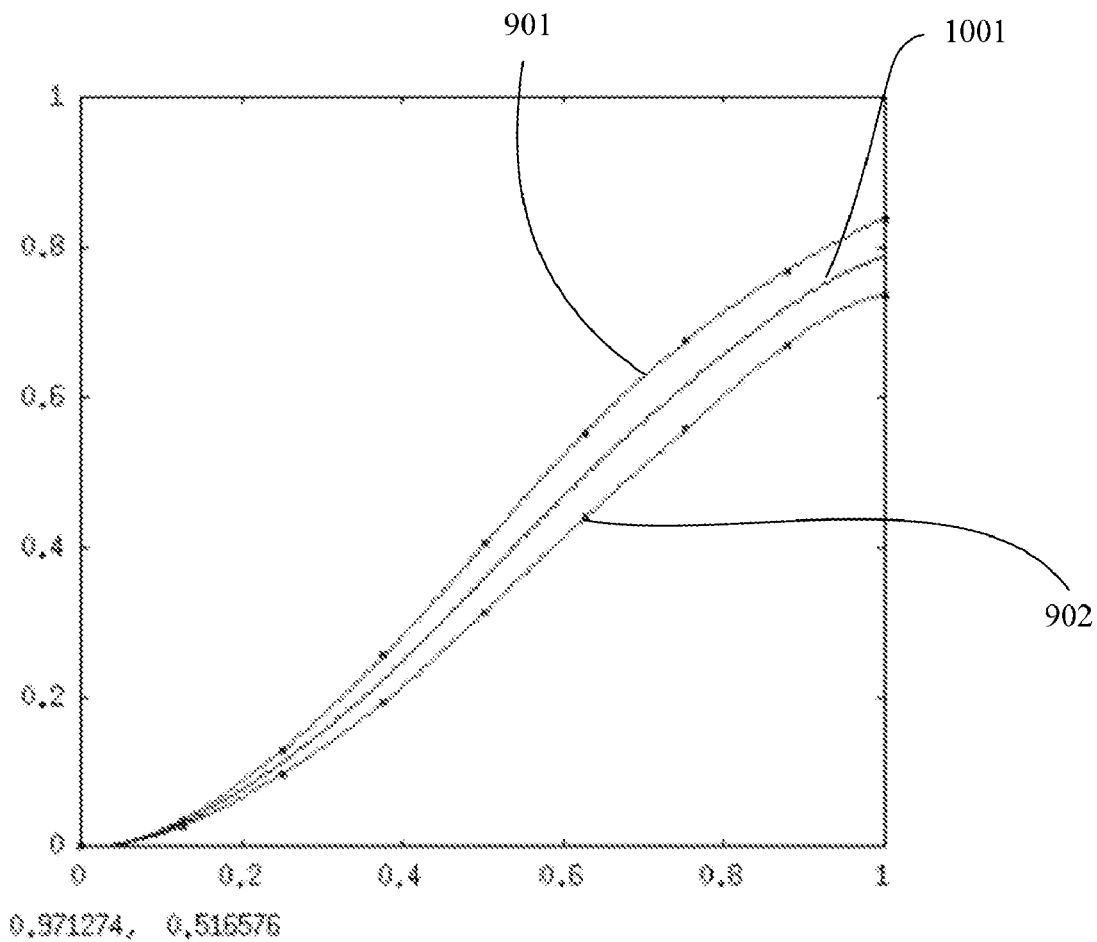
FIGS. 10A and 10B depict median difference curves before and after straightening, respectively, in accordance with an example embodiment.
Figure 10B:
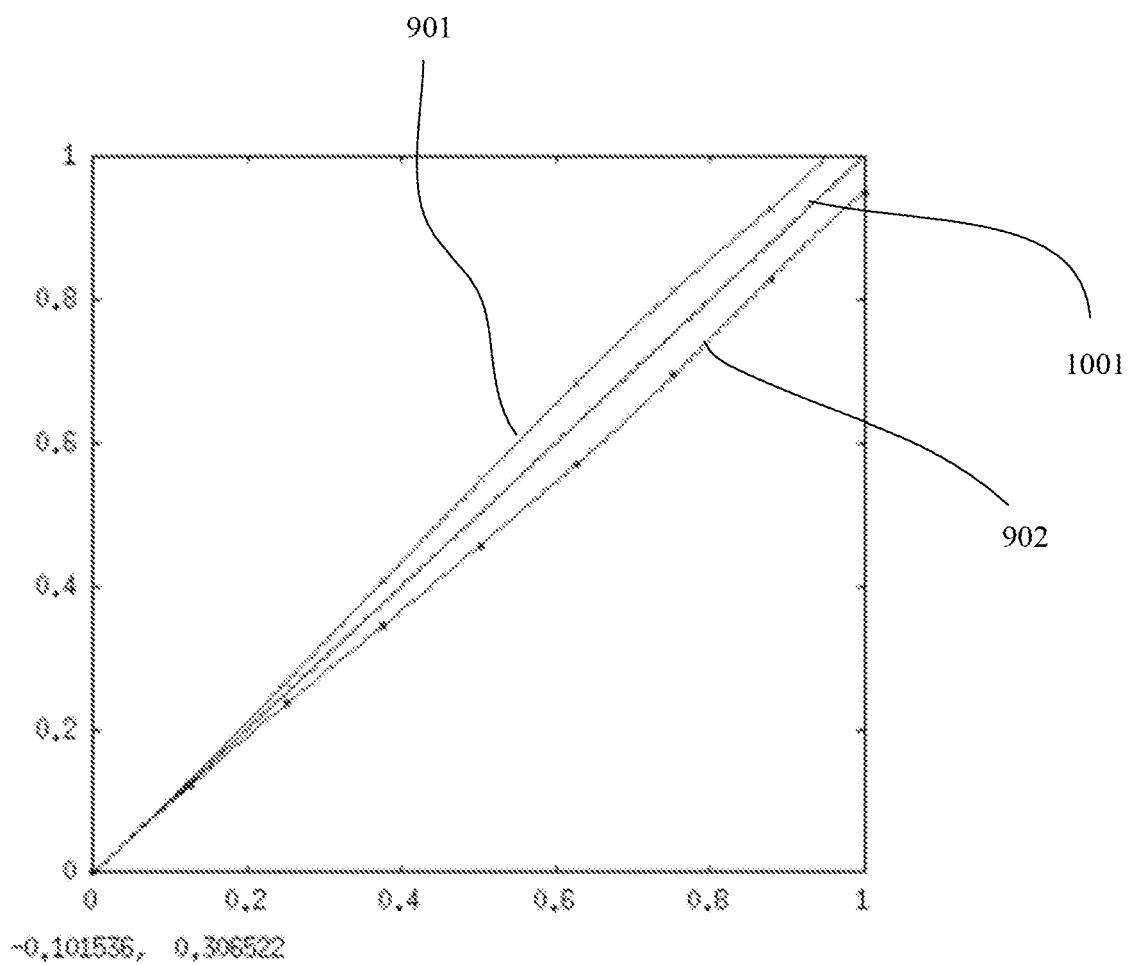

FIGS. 10A and 10B depict median curves before and after straightening, respectively, in accordance with an example embodiment. It will be appreciated that the median curves might be created in operation 605 of the process shown in FIG. 6. In an example embodiment, the calibration-processing module might compute a median curve after it has created interpolated response curves for all of the projectors in the system. Here again, any other measure of central tendency, such as an average, might be substituted for the median. In FIG. 10A, there are only two interpolated response curves, one for projector 901 and one for projector 902, that go into the computation of median curve 1001. It will be appreciated that the median curve acts as a normal for the interpolated response curves for the projectors, removing some or all of the response related to the capture device (e.g., digital camera) from the measurement data.

In an example embodiment, the calibration-processing module might then subtract the response values in the median curve from each of the interpolated response curves to compute an error or difference between the median curve and the interpolated response curve. The calibration-processing module might then add an identity channel response value to this error to create a median difference curve related to the median curve. In turn, the median curve is "straightened" to fit the identity channel response range so that the measured result from the median curve at each channel value equals the identity channel response value. FIG. 10B shows a median difference curve related to projector 901, a median difference curve related to projector 902, and a "straightened" median curve 1001 representing identity channel response.

Figure 11:
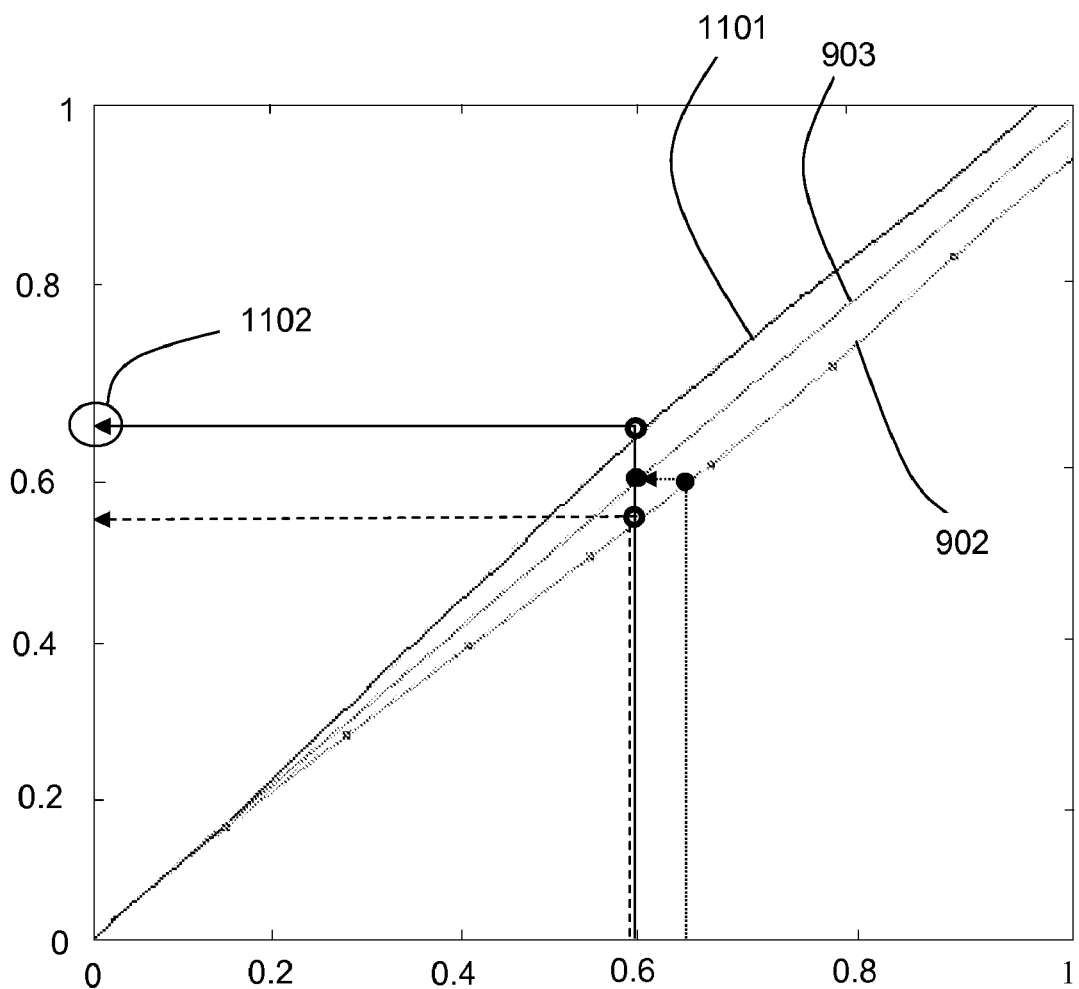
FIG. 11 depicts an inverted median difference curve, in accordance with an example embodiment.

FIG. 11 depicts an inverted median difference curve, in accordance with an example embodiment. It will be appreciated that the inverted median difference curve might be generated during operation 606 of the process shown in FIG. 6. In the example embodiment illustrated in FIG. 11, the calibration-processing module might compute the inverted median difference curve 1101 by inverting the median difference curve for projector 902 across the median curve 903. It will be appreciated that FIG. 11 does not include the median difference curve for projector 901.

To obtain a luminance adjustment value for a channel value, the calibration-processing module simply obtains the corresponding value from the inverted median difference curve. For example, if the channel value is 0.6, the corresponding luminance adjustment value 1102 is approximately 0.65. In an example embodiment, the calibration-processing module might persistently store this value in a table similar to the tables shown in FIGS. 5A and 5B for convenient subsequent access by the system during content display.

Any of the operations described herein that form part of the inventions are useful machine operations. The inventions also relate to a device or an apparatus for performing these operations. The apparatus may be specially constructed for that purpose or it may be a general-purpose computer selectively activated or configured by a computer program stored in the computer. In particular, various general-purpose machines may be used with computer programs written in accordance with the teachings herein or it may be more convenient to construct a more specialized apparatus to perform the operations.

The inventions can also be embodied as computer readable code on a computer readable medium. The computer readable medium is any data storage device that can store data which can thereafter be read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network-coupled computer system so that the computer readable code is stored and executed in a distributed fashion.

It will be further appreciated that the instructions represented by the operations in the above figures are not required to be performed in the order illustrated and that all of the processing represented by the operations might not be necessary to practice the inventions. Further, the processes described in any of the above figures can also be implemented in software stored in any one of or combinations of the RAM, the ROM, or the hard disk drive.

Although the foregoing inventions have been described in some detail for purposes of clarity of understanding, it will be apparent that certain changes and modifications can be practiced within the scope of the appended claims. In this regard, it will be appreciated that there are many other possible orderings of the operations in the processes described above and many possible modularizations of those orderings in the system. Likewise, the system might be based on a color model other than the 24-bit RGB model, for example, the CMYK (Cyan Magenta Yellow Black) color model. Accordingly, the present embodiments are to be considered as illustrative and not restrictive, and the invention is not to be limited to the details given herein, but may be modified within the scope and equivalents of the appended claims. In the appended claims, elements and/or operations do not imply any particular order of operation, unless explicitly stated in the claims or implicitly required by the disclosure.

What is claimed is:

1. A non-transitory device-readable medium containing instructions for controlling luminance in a multi-projector display system, the instructions comprising:
    instructions for measuring sampled color output from each of a plurality of projectors in the multi-projector display system using a plurality of calibration images;
    instructions for computing an interpolated response curve for each color channel for each projector based on results of the measuring, each projector having a plurality of color channels;
    instructions for generating a median difference curve for each color channel for each projector using the interpolated response curve for that color channel from each projector;
    instructions for building reverse mapping tables, one for each projector, using the interpolated response curves and the median difference curves, including instructions for generating an adjustment curve for each color channel for each projector based on the median difference curves;
    instructions for computing cross-data adjustment ranges;
    instructions for adjusting a value of a source pixel using the cross-data adjustment ranges to generate a scaled input value; and
    instructions for modifying select output pixel values of the projectors to control color luminance disparity among the projectors using the reverse mapping tables, including instructions for modifying a particular one of the select output values using one or more of the adjustment curves, the scaled input value, or both.

2. The non-transitory device-readable medium of claim 1, wherein the measuring instructions comprise:
    instructions for capturing the calibration images using a digital camera; and
    instructions for storing each captured calibration image together with other calibration data for the corresponding projector.

3. The non-transitory device-readable medium of claim 2, wherein the measuring instructions further comprise:
    instructions for computing a sampling region of pixels of each captured calibration image;
    instructions for separating pixels in each sampling region by color channel;
    instructions for computing a value for each color channel of each sampling region; and
    instructions for storing the computed values.

4. The non-transitory device-readable medium of claim 3, wherein the computed values are used to compute the interpolated response curves.

5. The non-transitory device-readable medium of claim 1, wherein in the generating instructions further comprise:
    generating a median curve for each color channel based on the interpolated response curves of that channel, wherein the median difference curves for a given color channel are generated based on the median curve for that color channel.

6. The non-transitory device-readable medium of claim 1, wherein the instructions for modifying comprise:
    instructions for using one or more of the adjustment curves to dynamically change the select output pixel values to affect a luminance change in one or more of the plurality of projectors.

7. The non-transitory device-readable medium of claim 1, wherein whether to use one or more of the adjustment curves, the scaled input value, or both to modify the particular one of the select output values is based at least in part on whether the source pixel is gray or color.

* * * * *